US 6,607,661 B2

(12) United States Patent
Koivula

(10) Patent No.: US 6,607,661 B2
(45) Date of Patent: Aug. 19, 2003

(54) FILTERING APPARATUS

(75) Inventor: Tuomo Koivula, Tampere (FI)

(73) Assignee: Parker Hannifin Oy, Urjala (FI)

( * ) Notice: Subject to any disclaimer, the term of this patent is extended or adjusted under 35 U.S.C. 154(b) by 0 days.

(21) Appl. No.: 09/897,339

(22) Filed: Jul. 2, 2001

(65) Prior Publication Data

US 2002/0014450 A1 Feb. 7, 2002

Related U.S. Application Data

(63) Continuation of application No. PCT/FI00/00976, filed on Nov. 9, 2000.

(30) Foreign Application Priority Data

Nov. 11, 1999 (FI) .............................. 19992429

(51) Int. Cl.$^7$ ............................................. B01D 29/66
(52) U.S. Cl. ................ 210/120; 210/123; 210/234; 210/333.01; 210/340; 210/410; 210/411; 210/436; 210/472
(58) Field of Search ............................... 210/120, 123, 210/234, 333.01, 340, 341, 411, 436, 472, 410

(56) References Cited

U.S. PATENT DOCUMENTS

| 2,365,766 A | * | 12/1944 | Levier | .......................... | 210/356 |
| 2,383,672 A | | 8/1945 | Neisingh | | |
| 4,055,500 A | | 10/1977 | Parker | | |
| 4,256,583 A | | 3/1981 | Lennartz | | |
| 4,341,642 A | * | 7/1982 | Koepke et al. | ............. | 210/767 |
| 6,248,246 B1 | * | 6/2001 | Koivula | ..................... | 210/798 |
| 6,368,497 B1 | * | 4/2002 | de Sylva | ................... | 210/120 |

FOREIGN PATENT DOCUMENTS

| GB | 755243 | 8/1956 |
| JP | 5245313 | 9/1993 |
| WO | WO00/18488 | 5/2000 |

OTHER PUBLICATIONS

Copy of the International Application Published Under the PCT (WO 01/342740 in PCT Application No. PCT/FI00/00976.

* cited by examiner

*Primary Examiner*—Matthew O. Savage
(74) *Attorney, Agent, or Firm*—Christopher H. Hunter

(57) ABSTRACT

The invention relates to a filtering apparatus, the operation of which is based on alternating filtering and flushing stages. The apparatus comprises one or several filter elements placed into a filter housing supported by a casing, the filter housing being provided with an inlet assembly for the liquid flow to be filtered, an outlet assembly for the filtered liquid flow, and a channel for flushing the filter elements with air. Further, the filter housing is arranged to be prefilled with liquid before the next filtering stage is initiated after the flushing. According to the invention, a filling channel is directed into the filter housing through the casing, the channel being provided with a valve, which closes the channel at the same time as the filter housing is opened, for example, for changing the filter elements. Closing may be automatic. The filter housing may include a removable cover and an axle bar supporting the filter elements and arranged between the cover and the valve and operated by a spring, the bar being moved from its place from the effect of the spring upon opening the cover at the same time as the spring closes the valve.

21 Claims, 2 Drawing Sheets

FILTERING APPARATUS

CROSS REFERENCE TO RELATED APPLICATIONS

This application is a continuation of International Application No. PCT/FI00/00976, filed Nov. 9, 2000, which designated the United States, and claims priority to Finish Patent Application 19992429, filed Nov. 11, 1999.

BACKGROUND OF THE INVENTION

The present invention relates to a filtering apparatus, comprising at least one filter element placed into a filter housing supported by a casing, the filter element being provided with an inlet assembly for the liquid flow to be filtered, an outlet assembly for the filtered liquid flow, an air channel for cleaning the filter element by flushing with air during the filtering stages, and a separate filling assembly for filling the housing with liquid before initiating the next filtering stage after flushing.

Continuous automatic filters, in which filtering and flushing stages alternate, are used, for example in diesel motors for filtering fuel or lubricant. Filtering is used to remove the principally solid impurities wearing the motor.

Filtering apparatuses applicable for the above-mentioned purpose are known, in which the filtering is conducted alternately in two or several parallel filtering chambers, controlled by a rotating spindle acting as a valve. The cleaning of the filtering chambers is performed by back-flushing between the filtering stages. An apparatus of this type is disclosed in U.S. Pat. No. 4,256,583.

As filtering again occurs after the flushing stage in the filter housing, it is advantageous to fill the filter housing slowly and controllably with liquid before initiating the filtering. The intention is to get air removed from the filter housing as completely as possible, as its mixing with the filtered fuel or lubricating oil would be detrimental.

An automatic filter is known, in which the filter housing is prefilled with clean filtered liquid directed into the housing from an opening arranged in the spindle controlling the parallel filter housings. The upper end of the filter housing in the filter is provided with a float, which closes the exit route for air, as the housing is filled with liquid. Filtering is then initiated in the filter housing from the inlet assembly in the spindle through the jacket of the filter element as a flow-through into the outlet assembly in the spindle.

A drawback in the above filter is that the filling assembly in the spindle is always open in the direction of the filter housing, which prevents the opening of the housing for changing the filter elements or for other servicing measures. Opening the filter housing would result in the discharge of the liquid under pressure out of the housing. It would be difficult to close the filling assembly in this filter, and it would require that the structure of the spindle be changed.

SUMMARY OF THE INVENTION

The object of the present invention is to provide a solution for the perceived drawbacks in the art, so that the filling assembly for prefilling the filter housing with liquid does not prevent the opening of the filter housing for servicing measures. It is characteristic of the filtering apparatus of the invention that the filling assembly is formed by a filling channel led through the casing of the filter housing, the channel being provided with a valve for closing the channel upon opening the filter housing.

The filling channel arranged according to the invention for prefilling the filter housing is advantageous especially in the filtering apparatus in accordance with the applicant's previous patent application FI 982113, filed Sep. 30, 1998, which has three filtering units controlled with a common valve. Two of the units are meant to operate alternately in the actual filtering process, at the same time as the third unit forms a reserve unit, into which the flow to be filtered is directed during the service of the first two units. The performance of such an apparatus requires that either of the first two units may be opened, for example, for changing the filter elements, without separate measures as soon as the filtering flow has been transferred to the reserve unit.

According to an advantageous embodiment of the invention, the filter housing is supported by a stationary casing, and is provided with a removable cover, and the valve is provided with a spring, which is arranged to achieve the closing of the valve as the cover is opened. In other words, as the cover of the filter housing is opened, the valve will automatically close the filling channel.

The cooperation of the cover and valve may be achieved, for example, with a bar affecting the compression spring in the valve, the bar moving from its place pushed by the spring as the cover is opened so that the spring simultaneously closes the valve. At the same time, the bar may advantageously be arranged as a support for the filter element or elements in the filter housing.

It has to be possible for the air remaining in the housing after the flushing stage to leave the housing during the prefilling of the filter housing through the filling channel, for which purpose the housing may be provided with an air vent at its upper end. Closing the channel after the filter housing has been filled with liquid may be achieved, for example, with the help of a float raised by the liquid. An axle formed from a tube may advantageously be used as the air vent, the axle working simultaneously as a support for the filter elements arranged around it.

Alternatively, air may be arranged to be discharged from the filter housing into a separate air container, into which air is compressed, pushed by the liquid filling the housing. The air container may be separated from the center of the filter housing and formed as part of an axial element, which from its lower end affects the compression spring of the valve in the filling channel so that the element makes the valve close as it moves from its place.

DETAILED DESCRIPTION OF THE PREFERRED EMBODIMENT

Figure 1:
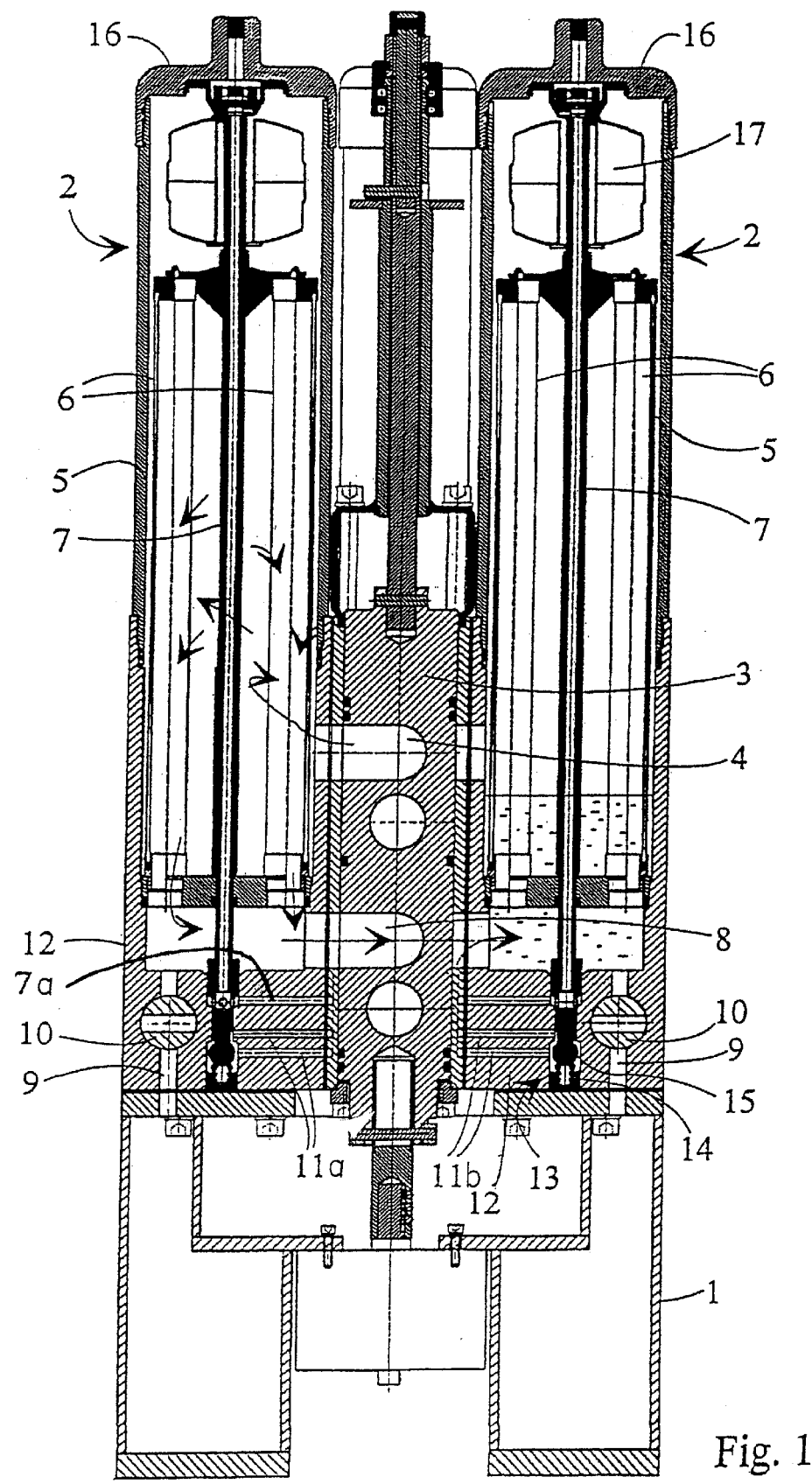
FIG. 1 is an elevation view of a filtering apparatus of the invention.

The filtering apparatus according to FIG. 1, which is suitable, for example, for an automatic filter of a fuel or lubricant system in a diesel motor, comprises according to the figure, a base 1 and two parallel filtering units 2, on the alternating use of which the operation of the apparatus is principally based. The filtering units 2 are controlled with a spindle 3 so that, as the filtering is running in the one unit, the second unit is being cleaned by backflushing with pressurised air, whereafter the operations are switched between the units. The apparatus further includes a third filtering unit controlled by the same spindle 3, which is Located behind the spindle in the figure, and which operates as a reserve unit during the service of the units 2 seen in the figure. Of these parts, the structure and operation of the apparatus corresponds to those disclosed in the patent application FI 982113, filed Sep. 30, 1998, or the international application PCT/FI99/00798, filed Sep. 29, 1999, now U.S. Pat. No. 6,248,246, which is incorporated herein by reference as part of this specification.

In FIG. 1, the leftmost of the two filtering units 2 is in the filtering stage, in which the travel of the flow to be filtered through the unit is indicated with arrows. The spindle 3 guides the flow to be filtered from the inlet channel (not shown) common for the units 2 through the inlet assembly 4 into the filter housing 5, which comprises eight cylindrical, candle-shaped filter elements 6 arranged as a ring around the central axle 7 formed from the tube of the filter housing so that the axle operates as a support for the filter elements.

During filtering, the housing 5 is entirely filled with the liquid to be filtered. The liquid to be filtered is infiltrated into the elements through jackets manufactured of filtering material, such as metal or plastic net, into the filter elements 6 in the filter housing 5, and is discharged as cleaned through the open lower ends of the elements into the outlet assembly 8 of the spindle 3, from which the flow is directed into the discharge channel (not shown) common for the filtering units 2.

In the left filtering unit 2 in FIG. 1, the inlet channel 9 for flushing air is closed by the valve 10 during the filtering stage. Upon transferring to the flushing stage following the filtering stage, the valve 10 is opened so that pressurised air flowing along the air channel 9 from the base 1 pushes the liquid in the filter housing 5 ahead into the reject channel (not shown), controlled by the reject spindle common for the units 2, whereafter the air flow continues along the same route so that the filter elements 6 in the housing are backflushed with air. As the flushing stage ends, the valve 10 closes the air channel 9.

After the flushing stage, before the filtering is initiated, prefilling of the housing with clean liquid is performed in the filter housing. In FIG. 1, the right filtering unit 2 is shown in this prefilling stage. The liquid for the prefilling stage is filtered, clean liquid from the flow outlet assembly 8 of the left filtering unit. A filling channel segment 11a feeds the liquid from the flow outlet assembly 8 to a filling channel segment 11b and into the filter housing of the right filtering unit. Filling channel 11 extends part of the way in the spindle 3 and part of the way in drillings formed into the stationary casing 12 of the filtering unit (only the portion of the channel 11 in the casing 12 is completely shown in FIG. 1).

A valve 13 with a compression spring 14 and with the vertically movable closing element 15 on top of the valve is located in each filling channel segment 11a, 11b inside the casing 12. The filtering unit 2 is provided with a removable cover 16 of the filter housing 5 so that the tubular central axle 7 of the housing keeps the valve open, stressed against the compression spring between the closing 15 and the cover 16. The filling flow can thus travel along the channel 11 to the lower end of the filter housing, through which it gradually fills the filter housing of the right filtering unit as a slow and controlled flow and pushes air present in the housing into the air vent formed by the axle 7, which leads downwards from the upper end of the housing and through air channel 7a.

In the upper end of the filter housing 5, an annular float 17 is arranged around the axle 7, the float being raised by the liquid during the filling of the housing so that the float achieves the closing of the air vent. When the float closes the vent, the filter housing 5 is substantially emptied from air, and the filtering stage may be initiated by rotating the spindle 3 so that its inlet and outlet assemblies 4, 8 are connected to the respective assemblies in the housing and allow the flow to be filtered to travel between the housing and the filter elements 6. The rotation of the spindle 3 simultaneously interrupts the filtering stage in the second filtering unit 2 in the apparatus.

For changing the filter elements 6 in the filtering units 2 seen in FIG. 1, the cover 16 of the unit is opened so that the compression spring 14 of the valve 13 can raise the closing element 15 and axle 7 so that the valve closes the prefilling channel 11. The axle 7 with the filter elements 6 it supports may now be freely lifted from the filter housing 5 and returned back after the elements have been regenerated or replaced with new elements. The change of filter elements or other servicing measures are preferably made as the filtering is directed to the reserve unit in the apparatus.

Figure 2:
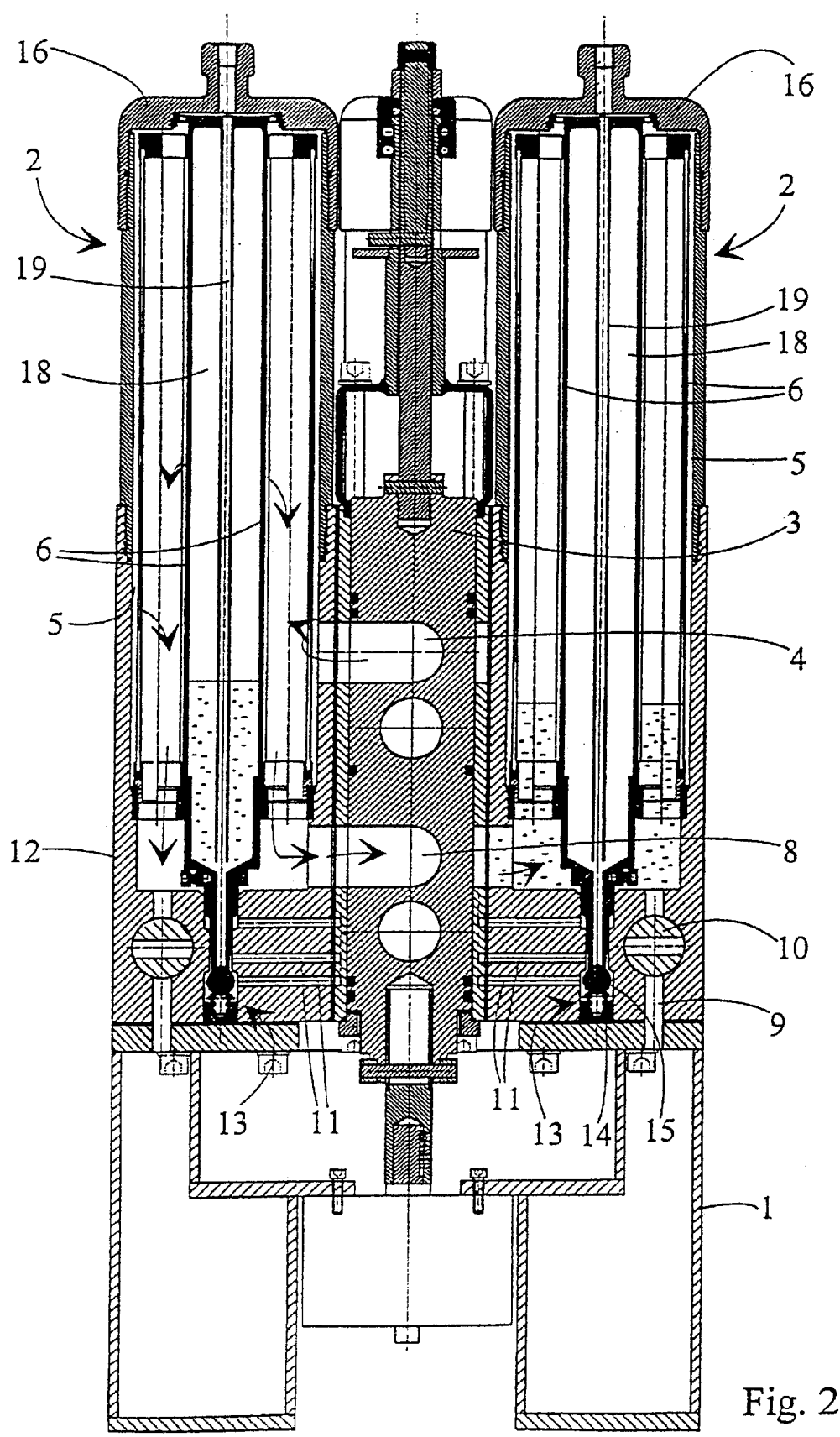
FIG. 2 is a similar view of a second filtering apparatus of the invention.

The filtering apparatus in FIG. 2 differs from the one in FIG. 1 in that during the prefilling of the filter housing, air remaining in the housing after the flushing is not pushed through the air vent 7 out of the apparatus, but the air container 18 is arranged in the center of the filter elements 5 in the housing, into which air in the housing is compressed through an axial channel 19. In the figure, the right filtering unit 2 is shown in the beginning stage of prefilling with liquid, similarly to FIG. 1, so that the liquid level in the filter housing 5 is rising. In this embodiment, the apparatus does not comprise floats 17 according to FIG. 1, but after reaching the upper end of the housing, the filling liquid flows forward into the axial connecting channel 19 and fills also the lower end of the air container 18 so that the situation is what it seen in the leftmost filtering unit in FIG. 2. With the help of the liquid, air is thus compressed into the air container 18 to the pressure corresponding to the normal operating pressure of the apparatus.

The left filtering unit 2 in FIG. 2 is shown in the filtering stage, which functions in the same manner as is explained above in connection of FIG. 1. Air compressed into the air container 18 is kept in the container during the filtering without being mixed with the liquid to be filtered.

As the filtering stage ends, the spindle 3 is rotated so that the flow assemblies 4, 8 into the left filtering unit are closed. For flushing, a connection is opened from the filter housing 5 into the reject channel so that air compressed in the air container 18 is able to push the liquid out of the filter housing with its pressure. The backflushing of the filter elements 6 is performed with pressurised air directed from the opened flushing air channel 9.

In the embodiment according to FIG. 2, the cylindrical air container 18 has been constructed as a support for the filter elements 6 surrounding it in a similar way as the tubular axle 7 in FIG. 1. Thus, the air container 18 is part of the axial element, the lower end of which bears against the closing element 15 pressing the spring 14 of the valve 13 and which, upon opening the cover 16 of the filtering unit, bounces upwards due to the effect of the spring 14 and may thus be lifted out of the filter housing 5 for changing the filter elements or for some other similar servicing measures. The spring 14 and the closing element 15 close the prefilling channel 11 for the liquid similarly as in the embodiment according to FIG. 1.

It is obvious for one skilled in the art that the various forms of embodiment of the invention are not limited to the examples shown above, but they may vary within the enclosed claims.

What is claimed is:

1. Filtering apparatus comprising two parallel filter housings, where alternate flushing and filtering stages are provided, each housing being defined by an openable casing and having at least one filter element contained in the housing; and each housing being provided with an inlet for liquid flow to be filtered, an outlet for the filtered liquid flow, and an air channel, for recurring filtering stages in the housing and cleaning of the housing and the at least one filter element contained therein by flushing with air between the filtering stages; the filtering apparatus further comprising a spindle for operating the filtering stages in alternation in said two parallel filter housings, the spindle working as a valve for connecting the inlet and outlet of each of the housings in turn to common inlet and outlet channels for the liquid flow, and each of the housings having a separate first filling channel segment and a separate second filling channel segment for prefilling the other housing with filtered liquid before a subsequent filtering stage is initiated therein after a flushing stage, the first filling channel segment for housing extending from the respective outlet for the liquid flow through the respective casing, the second filling channel segments being connected to each other, each of said first and second filling channel segments being provided with a separate valve for blocking flow between the respective first and second filling channel segments when the cover is removed from the respective housing.

2. The filtering apparatus according to claim 1, wherein the housing has a removable cover enclosing the one end of the housing, and the valve has a compression spring which is arranged to close the valve as the cover is removed.

3. The filtering apparatus according to claim 1, wherein the housing has a removable cover enclosing the one end of the housing, and the valve has a compression spring which is arranged to close the valve as the cover is removed.

4. The filtering apparatus according to claim 3, wherein the bar provides a support for at least one filter element in the filter housing.

5. The filtering apparatus according to claim 4, wherein the bar forms an axle for the filter housing, around which the filter elements are arranged as a ring.

6. The filtering apparatus according to claim 1, wherein the filter housing is provided with an air vent for discharging air in the housing as the housing is prefilled with liquid.

7. The filtering apparatus according to claim 6, wherein an upper end of the filter housing is provided with a float, the float arranged to close the air vent and being raised by the liquid as the housing is filled with liquid.

8. The filtering apparatus according to claim 6, wherein the filter housing is provided with a tubular axle, which provides the air vent and as a support for filter elements arranged around the tube.

9. The filtering apparatus according to claim 1, wherein the upper end of the filter housing is connected to an air container, into which air present in the housing is compressed as the housing is filled with liquid.

10. The filtering apparatus according to claim 9, wherein a plurality of elements are arranged in surrounding relation to the air container.

11. A filtering apparatus having alternating flushing and filtering stages, the filtering apparatus comprising a housing having an open end, a cover attachable to the open end of the housing, and at least one filter element contained in the housing; the housing being provided with an inlet for liquid flow to be filtered, an outlet for the filtered liquid flow, and an air channel, for recurring filtering stages in the housing and cleaning of the housing and the at least one filter element contained therein by flushing with air between the filtering stages; and the housing having a separate filling channel segment for prefilling the housing with filtered liquid before a subsequent filtering stage is initiated therein after a flushing stage, and valve means associated with said filling channel segment for closing the channel segment when the cover is removed from the housing, and a member extending through an interior of the housing for moving said valve means to an open position when said cover is installed on the open end of said housing.

12. The filtering apparatus according to claim 11, wherein the valve means includes a compression spring normally biasing a valve element into a closed position to block flow through the filling channel segment.

13. The filtering apparatus according to claim 12, wherein said member is an elongated bar in the housing operatively cooperating with the cover and the valve means to urge the valve element into an open position to allow flow through the filling channel segment when the cover is installed on the housing, the bar moving away from the valve means upon removing the cover from the housing so that the filling channel segment is closed by the valve element.

14. The filtering apparatus according to claim 13, wherein the filter element in the housing is supported by the bar.

15. The filtering apparatus according to claim 13, wherein the bar forms an axle for the housing; around which a plurality of filter elements are arranged and supported as a ring.

16. The filtering apparatus according to claim 11, further including an air vent in the housing for discharging air in the housing as the housing is prefilled with liquid.

17. The filtering apparatus according to claim 16, wherein an upper end of the filter housing is provided with a float, the float arranged to close the air vent and being raised by the liquid as the housing is filled with liquid.

18. The filtering apparatus according to claim 16, wherein the filter housing is provided with a tubular axle, which provides the air vent and as a support for filter elements arranged around the tube.

19. The filtering apparatus according to claim 11, wherein the upper end of the filter housing is connected to an air container, into which air present in the housing is compressed as the housing is filled with liquid.

20. The filtering apparatus according to claim 19, wherein a plurality of filter elements are arranged in surrounding relation to the air container.

21. The filtering apparatus according to claim 11, wherein the filling channel is branched off from the outlet for the filtered liquid flow so that the prefilling of the filter housing with liquid is made with the filtered liquid.

* * * * *